Thomas P. Hosmer
Paul R. Doherty
*INVENTORS*

Thomas P. Hosmer
Paul R. Doherty
INVENTORS

Thomas P. Hosmer
Paul R. Doherty
INVENTORS

United States Patent Office 3,552,931
Patented Jan. 5, 1971

3,552,931
APPARATUS FOR IMPARTING TRANSLATIONAL AND ROTATIONAL MOTION
Paul R. Doherty, Woburn, and Thomas P. Hosmer, Concord, Mass., assignors to Arthur D. Little, Inc., Cambridge, Mass., a corporation of Massachusetts
Filed July 14, 1967, Ser. No. 653,478
Int. Cl. B01j 17/00; B23b 47/18
U.S. Cl. 23—273                                    10 Claims

ABSTRACT OF THE DISCLOSURE

A pulling head which is capable of imparting both translational and rotational motion to a body. The pulling head is rugged, capable of retaining its alignment and is particularly well suited for use with crystal growing furnaces where the moving pulling head rod must extend into atmospheres in which the pressure and/or temperature differs materially from the ambient atmosphere.

The greatly increased activity in the growing synthetic crystals from a melt and the refining of crystalline materials by the so-called zone refining process have brought about the demand for improved mechanisms for accomplishing these operations. Thus, for example, there has developed in recent years a great body of art in the growing of materials for semiconductors as well as crystals for lasers. There are a number of techniques available for growing these synthetic crystalline and intercrystalline materials. Practically all of these techniques require that either the growing crystal, the mechanism for delivering a molten material to be crystallized, or a preformed rod of a material be moved during the process. Such movement must be both rotational and translational and it must be accomplished at precise and constant axial and angular velocities.

Apparatus for acrieving rotational and translational motion are normally referred to as "pulling heads" and this term will be used throughout the following description to identify the apparatus of this invention. It will, of course, be understood that the pulling head may be used for other processes than crystal growing and zone refining and that it may be oriented in any manner desired. For purposes of the following description it will be assumed that it is desired to move some apparatus connected with crystal growing or refining and that it is required either to move upwardly with rotation or downwardly with rotation.

In many of the pulling head apparatuses now available it is necessary for the pulling rod which is to be directly connected to the mechanism to be moved to extend into a zone of high or low pressure, or high temperature, or a combination of these. The pressure and/or temperature differentials which may exist between the ambient atmosphere where most of the equipment is located and the controlled atmosphere into which the pulling rod extends can create forces which give rise to misalignment and binding of the rod, the latter also being caused by the presence of foreign particles which may be products of the crystal growing operation. Any improved pulling head should therefore be free from such possibility of misalignment and binding as well as from vibration and other influences which may adversely affect the attainment of smooth and continuous rotational and translational motions.

It is therefore a primary object of this invention to provide an improved pulling head particularly useful in connection with crystal growing apparatus and zone refining mechanisms. It is another object of this invention to provide a pulling head of the character described which is a heavy-duty unit capable of operating smoothly with the pulling rod extending into a highor low-pressure vessel through a seal. It is yet another object of this invention to provide such a mechanism which is free from any binding of the pulling rod or any vibration of the apparatus. It is another object of this invention to provide a pulling head mechanism in which all of the forces applied to the pulling rod are perfectly balanced so that the rod is not capable of misalignment. It is an additional object of this invention to provide a pulling head of the character described which may be readily removed from the remaining portion of the equipment and readily installed into another apparatus. Other objects of the investion will in part be obvious and will in part be apparent hereinafter.

The invention, accordingly comprises the features of construction, combinations of elements and arrangement of parts which will be exemplified in the construction hereinafter set forth, and the scope of the invention will be indicated in the claims.

For a fuller understanding of the nature and objects of the invention reference should be had to the following detailed description taken in connection with the accompanying drawings in which.

Figure 1:
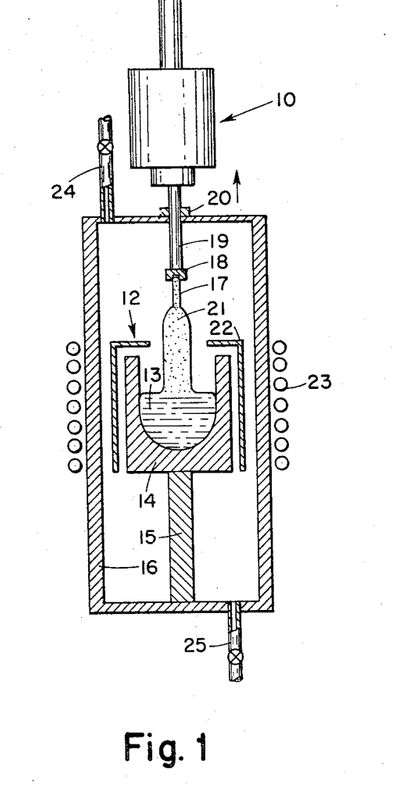
FIG. 1 illustrates in somewhat diagrammatic fashion the incorporation of the pulling head of this invention into a crystal growing apparatus in which the crystal is gradually pulled from a molten mass.

FIG. 1 illustrates somewhat diagrammatically the application of the pulling head of this invention to a method for growing crystals normally referred to as the Czochralski technique. The material from which the crystal is to be formed is completely molten and contained in a crucible. A seed crystal is lowered into the molten liquid and then gradually withdrawn and rotated with withdrawal. The temperature of the melt is adjusted so that a portion of the seed melts and then its temperature is lowered slightly until the seed crystal starts to grow. The seed crystal is then slowly raised with crystal growth.

In FIG. 1 the numeral 10 is used to indicate generally the pulling head of this invention and the numeral 12 to indicate the crystal growing mechanism. The molten material 13 from which the crystal is to be formed is contained within a crucible 14 held in a desired position by means of a supporting member 15 and contained within a housing 16. The housing may be fluid-tight and the atmosphere within it controlled in any way desired. The seed crystal 17 is held in chuck 18 which is attached to the rod 19 of the pulling head 10. The pulling rod 19 passes through a suitable seal 20 so that the main portion of the pulling head may be located outside the housing. The crystal 21 forms as the seed 17 is gradually withdrawn from the molten liquid 13. A suitable shielding 22 is located around the crucible and the lower portion of the crystal as it is formed. Heating means such as an RF coil 23 are placed external of the housing and positioned in a manner to maintain the molten material 13 at a suitable predetermined temperature. Finally, valve-controlled lines 24 and 25 are provided for introducing and withdrawing any gas which may be required to control the atmosphere within the housing.

Figure 2:
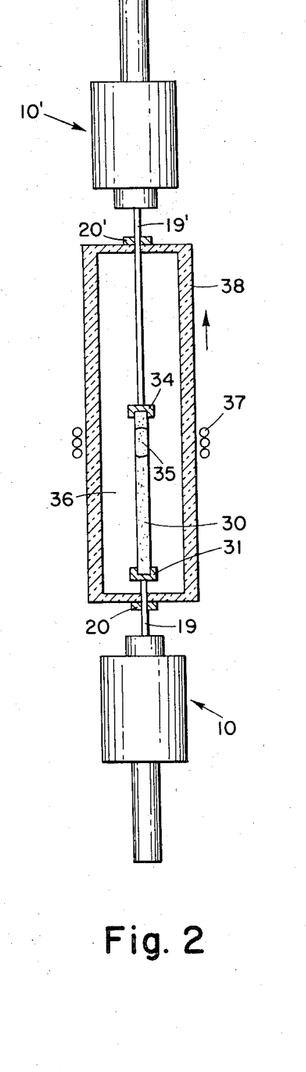
FIG. 2 illustrates in somewhat diagrammatic fashion the incorporation of two pulling heads of this invention in an apparatus suitable either for zone refining or growing of crystals through a floating zone.

FIG. 2 illustrates in diagrammatical fashion the application of two pulling heads of this invention to a crystal growing apparatus which operates by the floating zone technique. It will, of course, be appreciated that a similar mechanism is also applicable to the process of zone refining which is well known. In the apparatus of FIG. 2 a performed bar 30 of the material which is to be formed into a single crystal or which is to be zone refined is held between a lower chuck 31 which in turn is affixed to a pulling rod 19 of a lower pulling head 10. The bar 30 is held at its upper end by an upper chuck 34 which in turn is attached to pulling head rod 19′, of the upper pulling head 10′. There is created in the preformed bar 30 a fluid or molten zone 35 by virtue of the location of the zone within a heated area 36, the heating being accomplished by suitable coils 37. The entire apparatus is contained within a suitable housing such as a quartz tube 38 and the rods operate in lower seal 20 and upper seal 20′.

Figure 3:
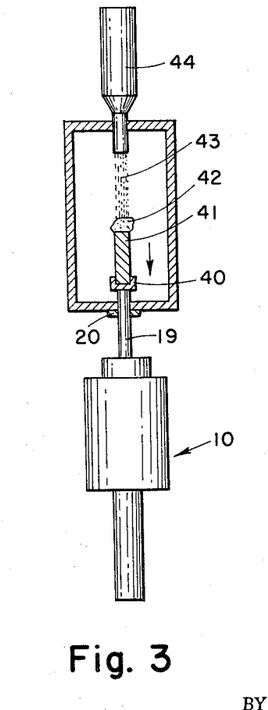
FIG. 3 illustrates in somewhat diagrammatic fashion the incorporation of the pulling head of this invention in an apparatus suitable for growing crystals by the Verneuil method.

FIG. 3 illustrates the application of the pulling head of this invention to an apparatus which is designed to grow crystals by the so-called Verneuil method in which a finely divided powdered material is mixed with a flame to strike a moving support in a molten condition. As the crystal boule is built up, the supporting member is rotated and moved downwardly, the mechanism for supplying the powdered material and the fuel remaining stationary in this type of apparatus. In FIG. 3 the pulling rod 19 terminates in a suitable chuck 40 for holding a boule support 41. As the boule 42 is formed on this support the pulling rod 19 is moved downwardly. A torch 44 directs the powdered material 43 in a flame against the boule positioned slightly below the highest temperature area of the flame. The material thus strikes the boule in a molten condition. Several different torches are available for this purpose (see for example U.S. Pat. 3,224,840). The pulling head of this invention is particularly well suited for use in the crystal growing apparatus of copending application Ser. No. 646,523, filed June 16, 1967, now U.S. Pat No. 3,511,614 in the names of Joseph H. Wenckus and Paul R. Doherty and assigned to the same assignee as this application.

FIGS. 1–3 illustrate only three types of crystal growing mechanisms to which the pulling head of this invention is applicable. It will, of course, be appreciated that there are other types of crystal growing mechanisms which may incorporate the pulling head of this invention. For example, the so-called Bridgeman-Stockbarder technique can be considered to be somewhat similar to that shown in FIG. 3 in that the crucible containing molten material is moved downwardly while the heat and the crystal-melt interface remain permanently positioned. Thus, the pulling head of this invention would be attached to the crucible in this type of crystal growing mechanism. It will also, of course, be appreciated that in the floating zone method or in zone refining the preformed bar 30 may be moved in either direction.

Figures 4, 5:
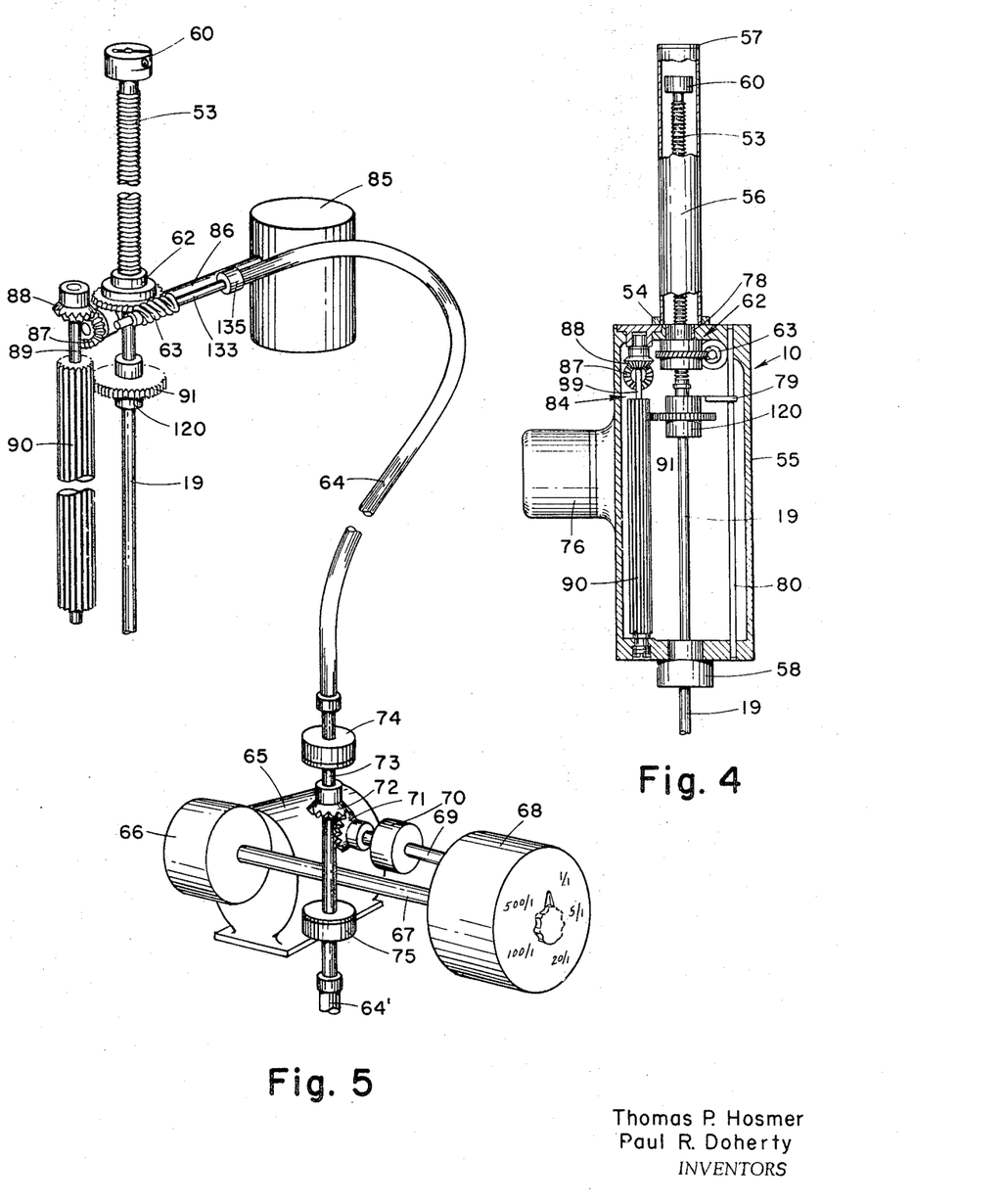
FIG. 4 is a side elevational view partly in cross section of the pulling head of this invention.
FIG. 5 is an expanded view of the gear train mechanism of the pulling head of this invention.

FIG. 4 is a somewhat simplified side elevational view partially in cross section of the pulling head of this invention; and FIG. 5 is an expanded view showing in particular the gear trains involved. These figures should be consulted together in the following discussion of the general construction of the pulling head. The pulling head is contained within a main housing 55 which has attached through ring 54 to it a duct cover 56 having a cover member 57. The pulling rod 19 extends the length of housing 55 as well as the length of the dust cover 56 when it is in its uppermost position. The upper portion of the pulling rod 19 is located within a screw drive assembly 53 which terminates in an upper clamp assembly 60 and a lower clamp assembly 120. Associated with the pulling rod are means for rotating it and moving it as will be described in detail with reference to FIGS. 6–8. The pulling rod extends through the bottom of housing 55 through a suitable bushing and adapter piece, the housing 58 of which is shown in FIG. 4.

It will be appreciated in the following description that the terms "upper' and "lower" are used merely for convenience to describe the orientation of the apparatus as it appears in FIGS. 4–9. However, these terms are only relative inasmuch as it will be seen from the example of the use of the pulling head in FIG. 2 that the assembly 10 may be oriented through 180° thus reversing the order of upper and lower as described hereinafter. It is also within the scope of this invention to employ the pulling rod in a horizontal position in which case it would be rotated through 90° or 270° respective to its orientation shown in FIG. 4.

In FIG. 4, the translational driving means is indicated generally by the numeral 62, that portion of this driving means shown in FIG. 4 includes a driving worm 63, connected through shaft 133, coupling 135 and flexible shaft 64 to a translational drive assembly (see FIG. 5). The motor 65 has associated with it suitable gearing 66 which, by means of shaft 67, is mechanically connected to a selector switch 68 which permits the adjustment in translational speed. This selector switch 68 is in turn connected through shaft 69 and torque limiting coupling 70 to the bevel gears 71 and 72 which are in turn, through shaft 73 and clutch 74, connected to the flexible shaft 64. The translational driving means 62 operates in a bushing 78 and is prevented from achieving any rotation through the antirotate arm 79 which is affixed to an antirotate shaft 80.

The mechanism for imparting rotational motion to the shaft 19 is generally indicated in FIG. 4 by the numeral 84. In FIG. 5 it will be seen that there is provided a motor 85 which by means of shaft 86 is connected to a driving bevel gear 87 which engages a second bevel gear 88. This driven bevel gear 88 is in turn mechanically affixed through shaft 89 to a rotary drive pinion 90 which engages a rotary spur gear 91 mounted on the pulling rod 19 by means of lower clamp assembly 120. In FIG. 4 it is shown that the rotational motor may be mounted on the mounting pad 76 which is part of the main housing 55 of the pulling head.

The pulling assembly may now be described in detail with references to FIGS. 6, 7 and 8. It will be convenient in describing these figures to begin at the top of the pulling head mechanism, and therefore reference should be made first to FIG. 6. It is the purpose of the upper rod clamp assembly generally indicated by the number 60 to affix the pulling rod 19 to the drive screw 95 so that the pulling rod 19 may rotate within the drive screw 95 which does not itself rotate but which imparts only translational motion to the rod 19. This upper rod clamp assembly 60 comprises a thrust bearing 96 which is held in a thrust bearing housing 97 by means of a snap ring 98. A bushing 99 is provided at the upper end of the drive screw 95. The pulling rod and camp assembly are free to rotate in the bushing 99 and in the drive screw which experiences only translational motion.

Translational motion is imparted to the pulling head rod 19 through the mechanism generally indicated by the numeral 62. In the achievement of the translational motion as explained above the drive screw assembly does not rotate. Rather the threaded nut 105 which engages the threads of the vertical drive screw 95 rotates and this is accomplished by virtue of its connection, through a shoulder 106, to a worm wheel 107 which in turn is driven by the worm 63. This rotating assembly is mounted between an upper thrust washer 110 and a lower thrust washer 111 which is maintained in position through a thrust plate 112. Reference to FIG. 8 will show that this thrust plate 112 is attached through shoulder screws 113 to the casting which forms the housing 55. Through this attachment tension loads on the pulling rod 19 are transmitted to the casting through screws 113.

Returning to FIG. 6, it will be seen that the bottom end of the drive screw 95 is affixed to an antirotate plate 115 which in turn is affixed to the antirotate arm 79 engaging the antirotate shaft 80. At the bottom terminus of the drive screw there is a bushing 117 in which the pulling rod 19 rotates. The spur gear 91 for rotating the shaft is mounted on the shaft through a clamp 120, a pin 121 and a thrust bearing 122 held in place by means of a snap ring 124.

Figure 8:
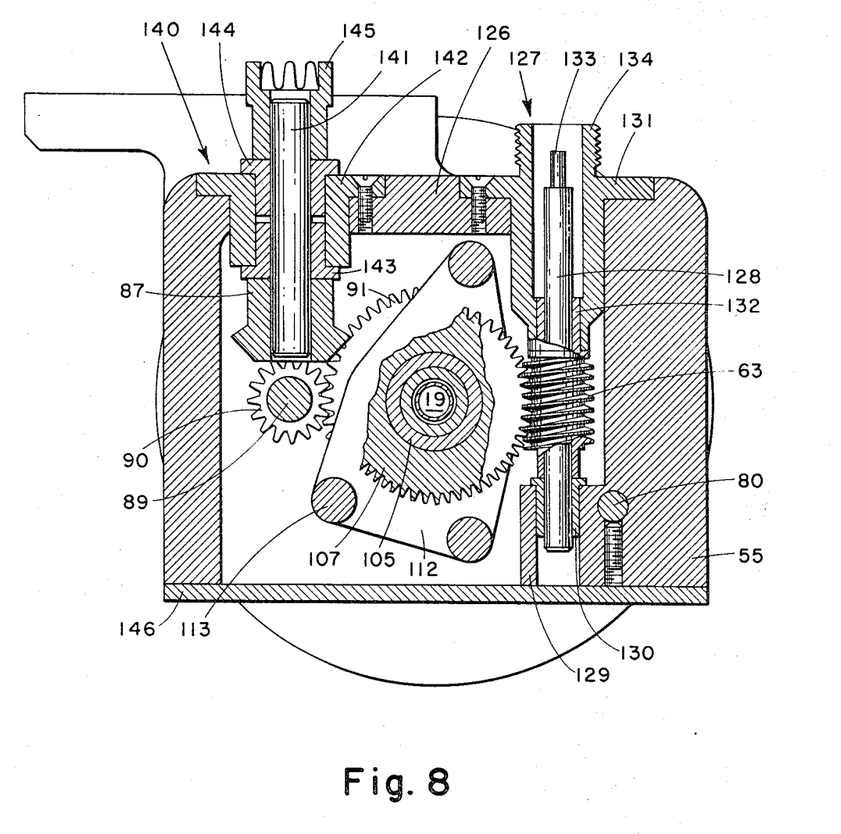
FIG. 8 is a cross section of the pulling head through line 8—8 of FIG. 6.

The worm drive adapter assembly 127 for translational motion is shown in the cross section of FIG. 8. The worm 63 is affixed to a worm shaft 128 which is mounted in the main housing 55 through a forward shaft mount 129 and a flanged bushing 130, and an after shaft mount 131 (attached to the back plate 126 of the housing) and a flanged bushing 132. The shaft 128 has an extension 133 adapted for attachment to the flexible shaft 64 (see FIG. 5) and the after shaft mount 131 has a threaded section 134 which is adapted for attachment through a threaded collar 135 (FIG. 5) for making the proper connection with the flexible shaft casing.

The rotary drive adapter assembly is also shown in detail in the cross section of FIG. 8. It is generally indicated by the numeral 140. The driving bevel gear 87 is mounted on a shaft 141 which is retained in a shaft mount 142 fixed to the back plate 126 of housing 55. A forward flanged bushing 143 and an after flanged bushing 144 are provided for the shaft 141. A suitable adapter piece 145 is attached to the end of the shaft and is designed to join shaft 141 with shaft 86 (FIG. 5) which is associated with the rotary drive motor 85. Finally, it will be seen that the housing has in addition to the back plate 126 a removable front plate 146 which completes the housing.

The pulling head may be further described with reference to FIG. 7 which is a longitudinal cross section of the lower portion of the device. The bushing housing shown generally in FIG. 4 as numeral 58 will be seen to comprise an adapter piece 151 in which there is located a bushing 152 furnishing the necessary alignment for the pulling rod 19 as it extends beyond the bottom of housing 55. The adapter piece 151 is arranged to be connected with a housing such for example as the quartz tube 38 of FIG. 2. For this purpose there is provided an annular groove 153 which is suitable for retaining an O-ring 154.

The adapter piece contains a gland seal generally indicated by the numeral 155. This seal comprises a body piece 156, an O-ring 157 which contacts pulling rod 19, an O-ring 158 which seals the gland body to the adapter piece 155, a felt wiper 159, and a metallic wiper ring 160. The gland assembly is threaded into adapter piece 151 and the wipers are held in place by a snap ring 161. The end of the gland body terminates in a hexagonal member 162. When the pulling head assembly is attached to the equipment with which it is to be used, a fluid-tight seal with the inner volume of such equipment is achieved through O-ring seals 154 and 158. The pulling rod must of course rotate and move while retaining this fluid-tight condition in the equipment and the O-ring seal 157 makes this possible. The gland assembly is designed to resist the pressure of the friction forces which must be overcome when the pulling rod is moved. It is also designed to be easily and quickly removable for cleaning.

The rotary drive pinion 90 and its associated shaft 89 are retained in position within the housing and mounted therein through a flanged bushing 165 which is positioned within a section 166 of the housing bottom. A fine pitch adjustment screw 167 and a suitable set screw 168 are provided for axial adjustment of the pinion shaft in order to obtain proper bearing clearances. An electrical connection opening 170 is provided into the housing for passing through the necessary electrical lines for the rotational motor 85 and travel limiting microswitches as shown generally at 171. The microswitches 171 (both upper and lower) are actuated by antirotate arm 79.

Figure 9:
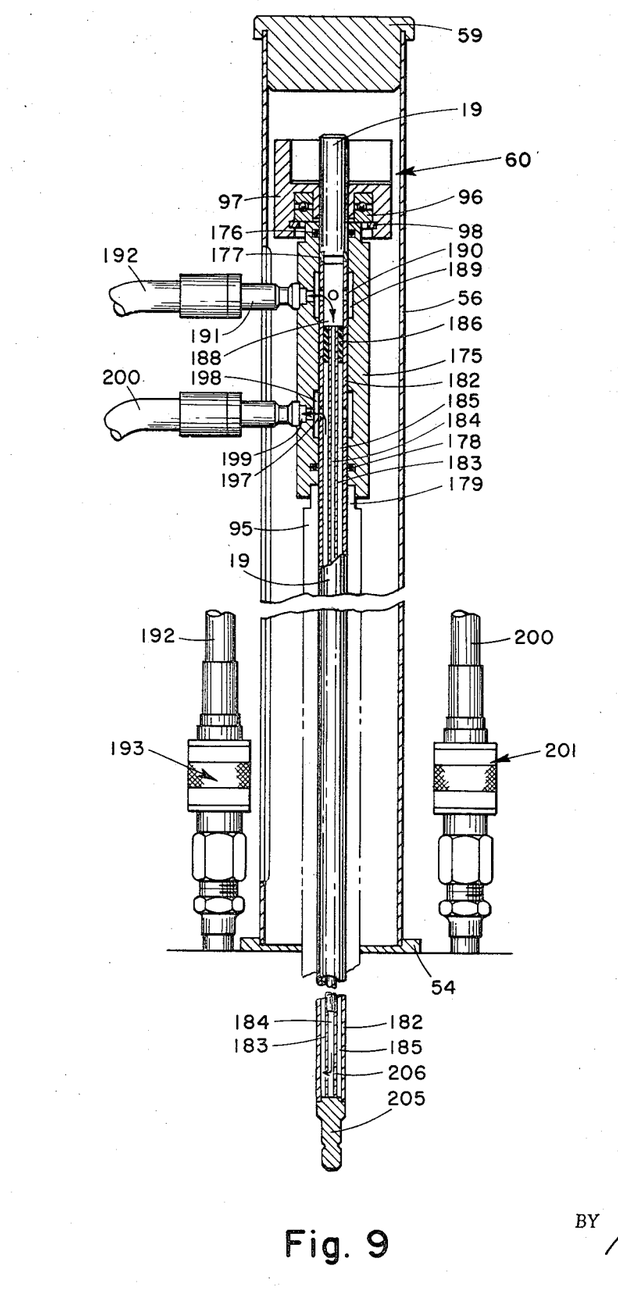
FIG. 9 is a cross section of the upper portion of a modification of the pulling head showing the incorporation of rod cooling means.

FIG. 9 shows a modification of the apparatus of this invention which provides for the cooling of the pulling rod 19. In this figure like numbers refer to like elements in FIG. 6. The dust cover 56 is shown to be closed with a metallic cap 59 which snaps down over the top of the dust cover in pace of the cap 57 of FIG. 6.

In order to cool the pulling rod 19 it is necessary to be able to direct a fluid coolant down through the rod and then return it for discharge. This in turn requires some modification in the upper and lower ends of the pulling rod and the manner in which the drive screw 95 is attached to the rod. In the modification shown in FIG. 9 there is provided a gland body 175 surrounding the upper portion of the pulling rod and tightly sealed thereto through an O-ring 176, a weld 177 and a lower O-ring 178. The gland body 175 is affixed to the drive screw 95 over a neck portion 179 of the drive screw. The pulling rod itself is formed of an outer tubing 182 and an inner tubing 183, the latter having internal thereof an inner coolant passage 184. The outer tubing 182 and the inner tubing 183 define between them an annular outer coolant passage 185. The passage 185 is closed at the terminal end of the inner tubing 183 by means of a suitable plug 186. Above the plug 186 and defined within the outer tubing 182 is an inlet coolant chamber 188 which is in fluid communication with an upper annular groove 189 defining a fluid passage and connected to the chamber by means of a series of ports 190. The annular passage 189 in turn is in fluid communication with an inlet conduit 191 which is in turn, through a suitable coupling, connected to an inlet water tubing 192 terminating in a quick disconnect 193.

In a similar manner the outer tubing 182 has ports 197 which provide fluid communication between the annular space 185 and an annular groove defining a passage 198. This latter passage is, in turn, through an outlet water conduit 199, connected to an outlet tube 200 which in turn is connected to a quick disconnect 201. At the bottom end of the cooled pulling rod there is placed a solid plug 205 which in effect closes both the inner coolant passage 184 and the outer coolant passage 185. Communication between these two is through ports 206.

In operation, water or other coolant is introduced through tubing 192 and passes by way of chamber 188 into the inner water passage defined by the inner tubing 183. At the end of the pulling rod the cooling water is transferred through ports 206 into the outer water passage 185 and returned via this passage, ports 197, annular passage 198, and conduit 199 into outlet tubing 200.

Figure 6:
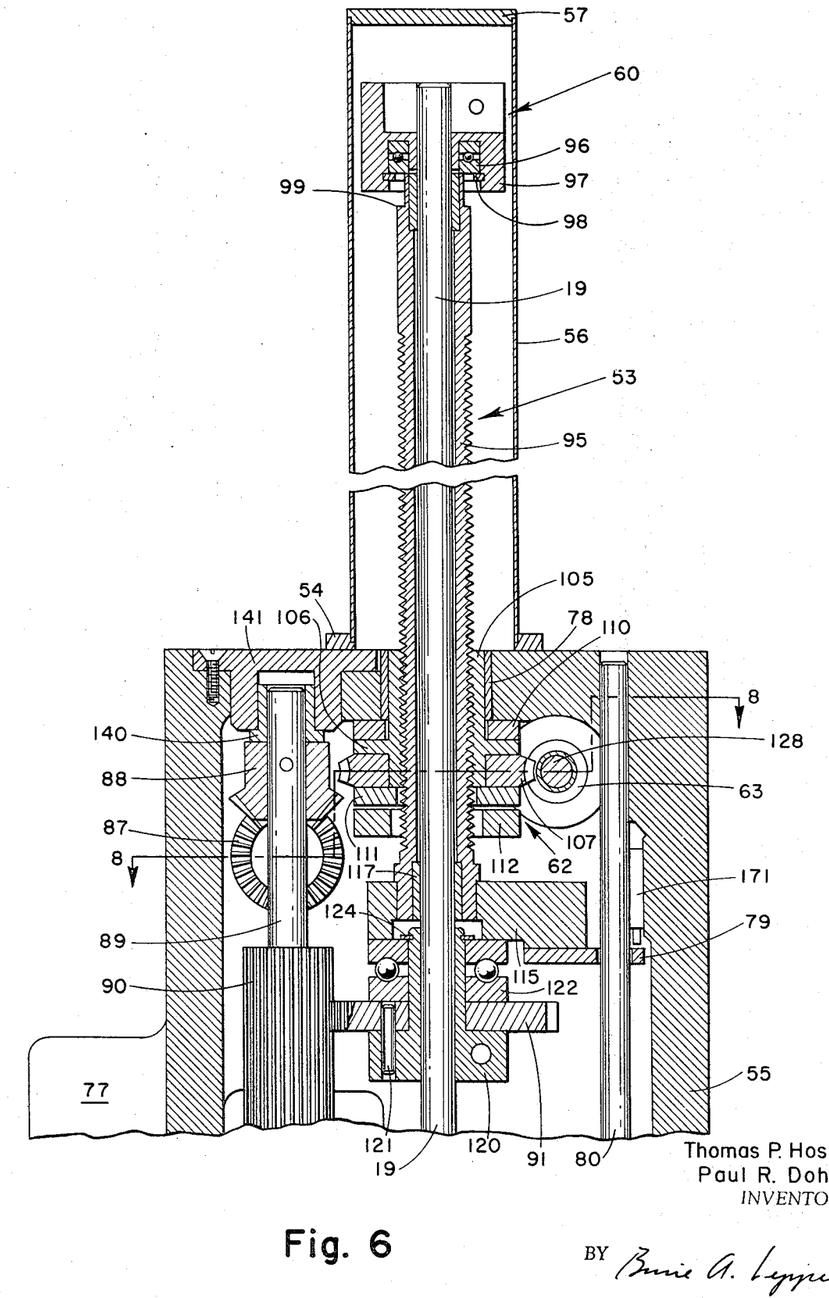
FIG. 6 is a detailed longitudinal cross section of the of the upper portion of the pulling head.
Figure 7:
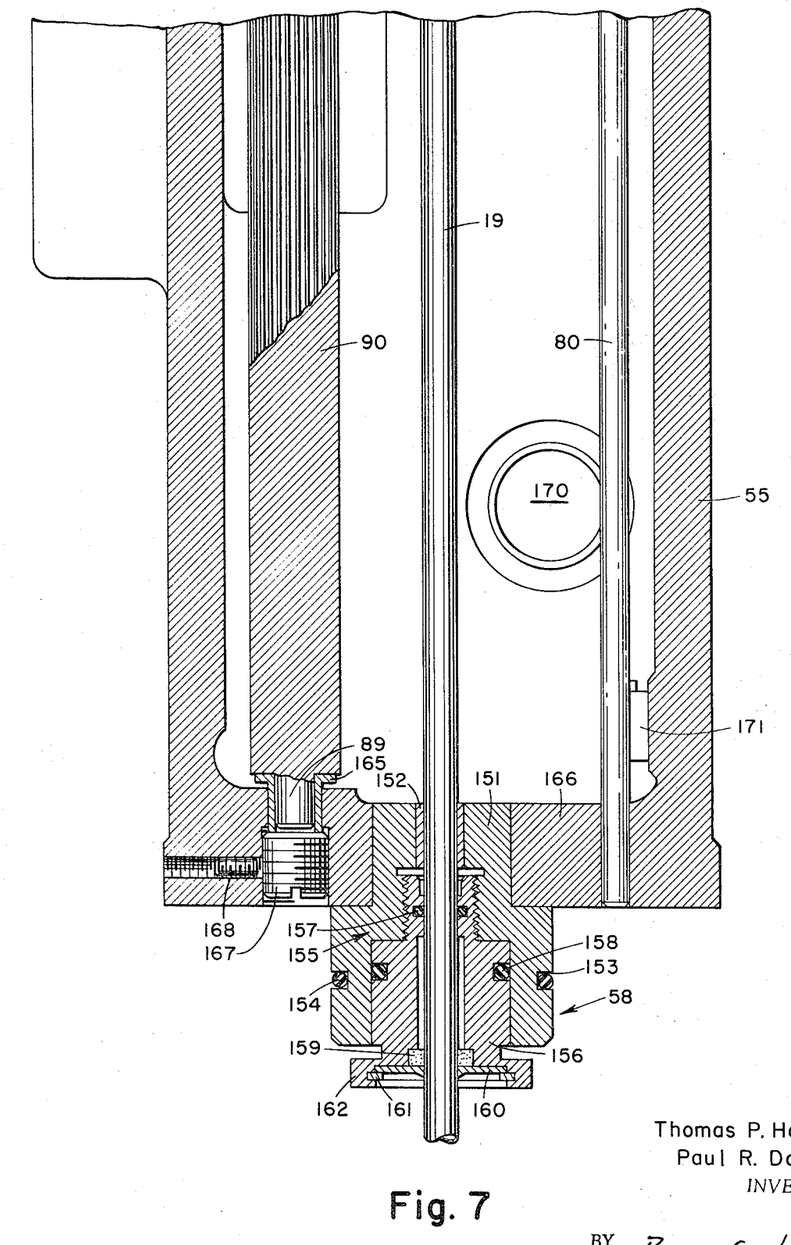
FIG. 7 is a detailed cross sectional view of the lower portion of the pulling head.

Once the pulling head is assembled into the structure shown by a combination of FIGS. 6 and 7 it may be connected to any device with which it is to be used, e.g., the apparatus of FIGS. 1, 2 or 3. The connection can be easily and rapidly made by providing the crystal growing apparatus with a suitable opening adapted to receive the adapter piece 58 (FIG. 7) and make, if desired, a fluid-tight seal such as by means of O-ring seal 154. Inasmuch as the alignment of the pulling rod is achieved by the design and construction of the pulling head as described, no further alignment of the rod within the crystal growing (or other) apparatus is required, provided of course the connection is properly aligned.

Because of this type of attachment to an apparatus, and because the mechanisms for imparting translational and rotational motions to the pulling rod are completely isolated from the apparatus (and particularly from any regions of high or low pressure and/or temperature) the pulling head is capable of operating smoothly with the pulling rod extending into any desired surroundings. Moreover, the ability, if desired, continuously to cool (or otherwise control the temperature of the pulling rod) contributes to the adaptability of this apparatus to high temperature applications.

The use of the jack screw type of translational drive makes the pulling head quite rugged in construction for there is no need to offset the shaft from the translational driving mechanism as is normally done in this type of apparatus. All forces acting upon the pulling rod are balanced, which leads to smooth rotation with accurately controlled angular velocities as well as to uniform, vibration-free translational motion. In addition, precise alignment of the pulling rod is maintained throughout the range of travel.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:
1. An apparatus for imparting translational and rotational motions to a body, comprising in combination:
 (a) a rod adapted for attachment to a body to be moved;
 (b) translational driving means directly connected to said rod, said translational driving means comprising in combination:
  (1) a nonrotatable screw drive within which said rod is mounted in rotatable relationship thereto, and
  (2) means for imparting translational motion to said screw drive;
 (c) rotational driving means, comprising in combination:
  (1) a rotary spur gear affixed to said rod,
  (2) rotary drive pinion means arranged to engage and drive said rotary spur gear, and
  (3) means to rotary drive pinion means; and
 (d) housing means having an adapter piece arranged to make a sealed connection with apparatus in which said body is to be moved, said adapter piece incorporating gland seal means through which said rod extends external of said housing whereby said rod maintains a desired alignment and said translational and rotational driving means are isolated from the atmosphere maintained within said apparatus.

2. An apparatus in accordance with claim 1 wherein said means for imparting translational motion to said screw drive comprises a rotatable threaded nut adapted to engage threads of said screw drive and having a worm wheel attached thereto, and worm drive means associated with said worm wheel.

3. An apparatus in accordance with claim 2 wherein said worm drive means includes motor means, the speed of which can be selectively controlled to control the rate of said translational motion.

4. An apparatus in accordance with claim 1 including antirotate means connected to said screw drive.

5. An apparatus in accordance with claim 1 wherein said rotational driving means is mounted between thrust washers, one of which is maintained in position by means of a thrust plate attached by screw means to said housing whereby tension loads on said rod are transmitted to said housing.

6. An apparatus in accordance with claim 1 further characterized by having adjustment screw means associated with said rotary drive pinion means to effect axial adjustment of said drive pinion means.

7. An apparatus in accordance with claim 1 further characterized by having means to cool said rod, said cooling means comprising in combination:
 (1) tubing means located internally of said rod and defining within said tubing a first fluid passage and with the internal wall of said rod a second annular fluid passage, said first and second fluid passages being in fluid communication at that end of said rod to which said body is to be affixed,
 (2) means to introduce a fluid coolant into said first passage; and
 (3) means to withdraw said fluid coolant from said second passage.

8. In an apparatus in which a body is maintained through translational motion within a zone of high temperature as is simultaneously rotated, moving means for imparting translational and rotational motion to said body, said moving means comprising in combination:
 (a) a rod adapted for attachment to said body to be moved;
 (b) translational driving means directly connected to said rod, said translational driving means comprising in combination:
  (1) a nonrotatable screw drive within which said rod is mounted in rotatable relationship thereto, and
  (2) means for imparting translational motion to said screw drive;
 (c) rotational driving means, comprising in combination:
  (1) a rotary spur gear affixed to said rod,
  (2) rotary drive pinion means arranged to engage and drive said rotary spur gear, and
  (3) means to rotate said rotary drive pinion means; and
 (d) housing means having an adapter piece arranged to make a sealed connection with said apparatus, said adapter piece incorporating gland seal means through which said rod extends external of said housing whereby said rod maintains a desired alignment and said translational and rotational driving means are isolated from the atmosphere maintained within said apparatus.

9. An apparatus in accordance with claim 8 further characterized by having means to cool said rod, said cooling means comprising in combination:
 (1) tubing means located internally of said rod and defining within said tubing a first fluid passage and with the internal wall of said rod a second annular fluid passage, said first and second fluid passages being in fluid communication at that end of said rod to which said body is to be affixed;
 (2) means to introduce a fluid coolant into said first passage; and
 (3) means to withdraw said fluid coolant from said second passage.

10. An apparatus for imparting translational and rotational motions to a body, comprising in combination:
 (a) a pulling rod adapted for attachment to a body to be moved;
 (b) translational driving means directly connected to said pulling rod, said translational driving means comprising in combination:
  (1) a nonrotatable screw drive within which said rod is mounted in rotatable relationship thereto,
  (2) means for imparting translational motion to said screw drive comprising a rotatable threaded nut adapted to engage threads of said screw drive and having a worm wheel attached thereto, (3) motor means adapted through shaft means and worm drive means to rotate said worm wheel;

(c) rotational driving means, comprising in combination:

(1) a rotary spur gear affixed to said pulling rod, (2) rotary drive pinion means arranged to engage and drive said rotary spur gear, (3) means, including motor means, adapted to rotate said rotary drive pinion means, and (4) adjustment screw means associated with said rotary drive pinion means to effect axial adjustment of said drive pinion means;

(d) housing means having an adapter piece arranged to make a sealed connection with apparatus in which said body is to be moved, said adapter piece incorporating gland seal means through which said pulling rod extends external of said housing whereby said pulling rod maintains a desired alignment and said translational and rotational driving means are isolated from the atmosphere maintained within said apparatus, said rotational driving means being mounted between thrust washers, one of which is maintained in position by means of a thrust plate attached by screw means to said housing whereby tension loads on said pulling rod are transmitted to said housing.

References Cited

UNITED STATES PATENTS

| | | | |
|---|---|---|---|
| 534,180 | 2/1895 | Smart et al. | 77—33.3 |
| 537,719 | 4/1895 | Russell | 77—34.7 |
| 2,797,598 | 7/1957 | Labenz | 77—34.7 |
| 2,972,915 | 2/1961 | Milanovits et al. | 77—33.3 |
| 2,083,194 | 6/1937 | Johnson | 74—22 |
| 2,796,767 | 6/1957 | Carpenter | 74—22 |
| 3,088,853 | 5/1963 | Harper | 23—273X |
| 3,238,022 | 3/1966 | Miller | 23—273 |

FOREIGN PATENTS

| | | | |
|---|---|---|---|
| 510,635 | 4/1952 | Belgium | 77—34.7 |

NORMAN YUDKOFF, Primary Examiner

R. T. FOSTER, Assistant Examiner

U.S. Cl. X.R.

74—22; 77—34.7